(12) United States Patent
Cakulev et al.

(10) Patent No.: US 11,363,447 B2
(45) Date of Patent: Jun. 14, 2022

(54) METHOD AND DEVICE FOR MANAGING AND ALLOCATING BINDING SERVICE IN A WIRELESS NETWORK

(71) Applicant: Verizon Patent and Licensing Inc., Arlington, VA (US)

(72) Inventors: Violeta Cakulev, Milburn, NJ (US); Sudhakar Reddy Patil, Flower Mound, TX (US); Hossein M. Ahmadi, Parsippany, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 13 days.

(21) Appl. No.: 16/529,240

(22) Filed: Aug. 1, 2019

(65) Prior Publication Data

US 2021/0037375 A1    Feb. 4, 2021

(51) Int. Cl.
| | |
|---|---|
| *H04W 8/18* | (2009.01) |
| *H04M 15/00* | (2006.01) |
| *H04W 80/10* | (2009.01) |
| *H04W 60/00* | (2009.01) |
| *H04W 8/08* | (2009.01) |
| *H04W 12/06* | (2021.01) |
| *H04W 8/20* | (2009.01) |

(52) U.S. Cl.
CPC ........... *H04W 8/186* (2013.01); *H04M 15/66* (2013.01); *H04W 8/08* (2013.01); *H04W 8/20* (2013.01); *H04W 12/06* (2013.01); *H04W 60/00* (2013.01); *H04W 80/10* (2013.01)

(58) Field of Classification Search
None
See application file for complete search history.

(56) References Cited

U.S. PATENT DOCUMENTS

| | | | |
|---|---|---|---|
| 2012/0120845 A1* | 5/2012 | Perras | H04L 65/1096 370/254 |
| 2012/0225679 A1* | 9/2012 | McCann | H04L 65/1016 455/466 |
| 2016/0373348 A1* | 12/2016 | Renzullo | H04L 67/02 |
| 2018/0270778 A1* | 9/2018 | Bharatia | H04L 65/1073 |
| 2018/0352050 A1* | 12/2018 | Li | H04W 8/08 |
| 2019/0158408 A1* | 5/2019 | Li | H04L 67/104 |
| 2019/0191467 A1* | 6/2019 | Dao | H04W 76/10 |
| 2019/0357301 A1* | 11/2019 | Li | H04M 15/00 |

* cited by examiner

*Primary Examiner* — Adnan Baig

(57) ABSTRACT

A first network device may receive a binding request from a second network device. The binding request may include information relating to one or more of the second network device, a type of a session policy generated by the second network device, or a user equipment associated with the session policy. The first network device may determine an association between the second network device and the user equipment, and generate binding data. The binding data may include information relating to one or more of the user equipment, the second network device, the session policy, or the association. The first network device may assign a binding identifier to the binding data. The binding identifier may be configured to index the binding data associated with the user equipment. The first network device may cause an action to be performed in connection with the binding data or the binding identifier.

20 Claims, 10 Drawing Sheets

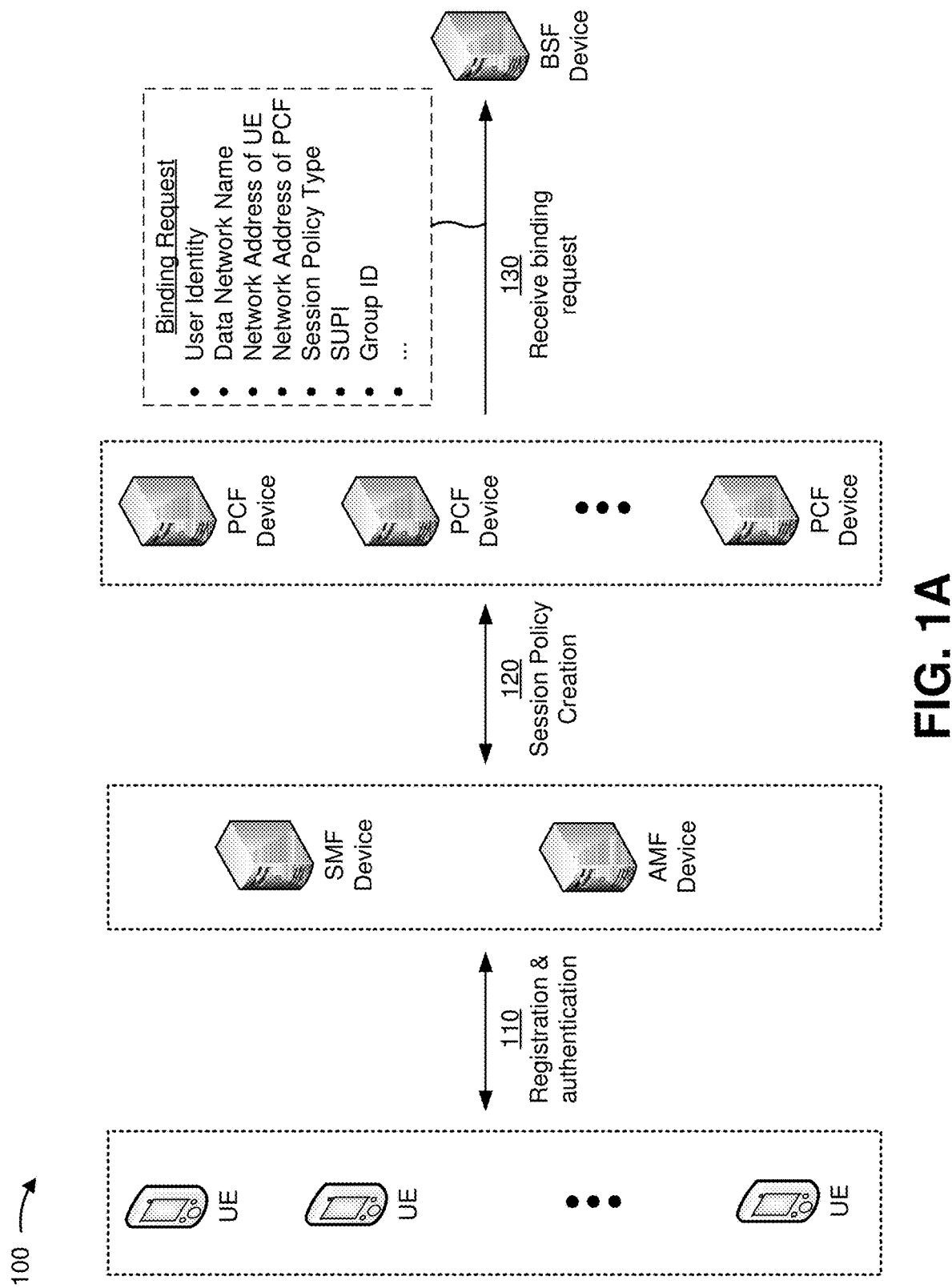

METHOD AND DEVICE FOR MANAGING AND ALLOCATING BINDING SERVICE IN A WIRELESS NETWORK

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

BRIEF DESCRIPTION OF THE DRAWINGS

FIGS. 1A-1D are diagrams of one or more example implementations described herein.

DETAILED DESCRIPTION OF PREFERRED EMBODIMENTS

Figure 1B:
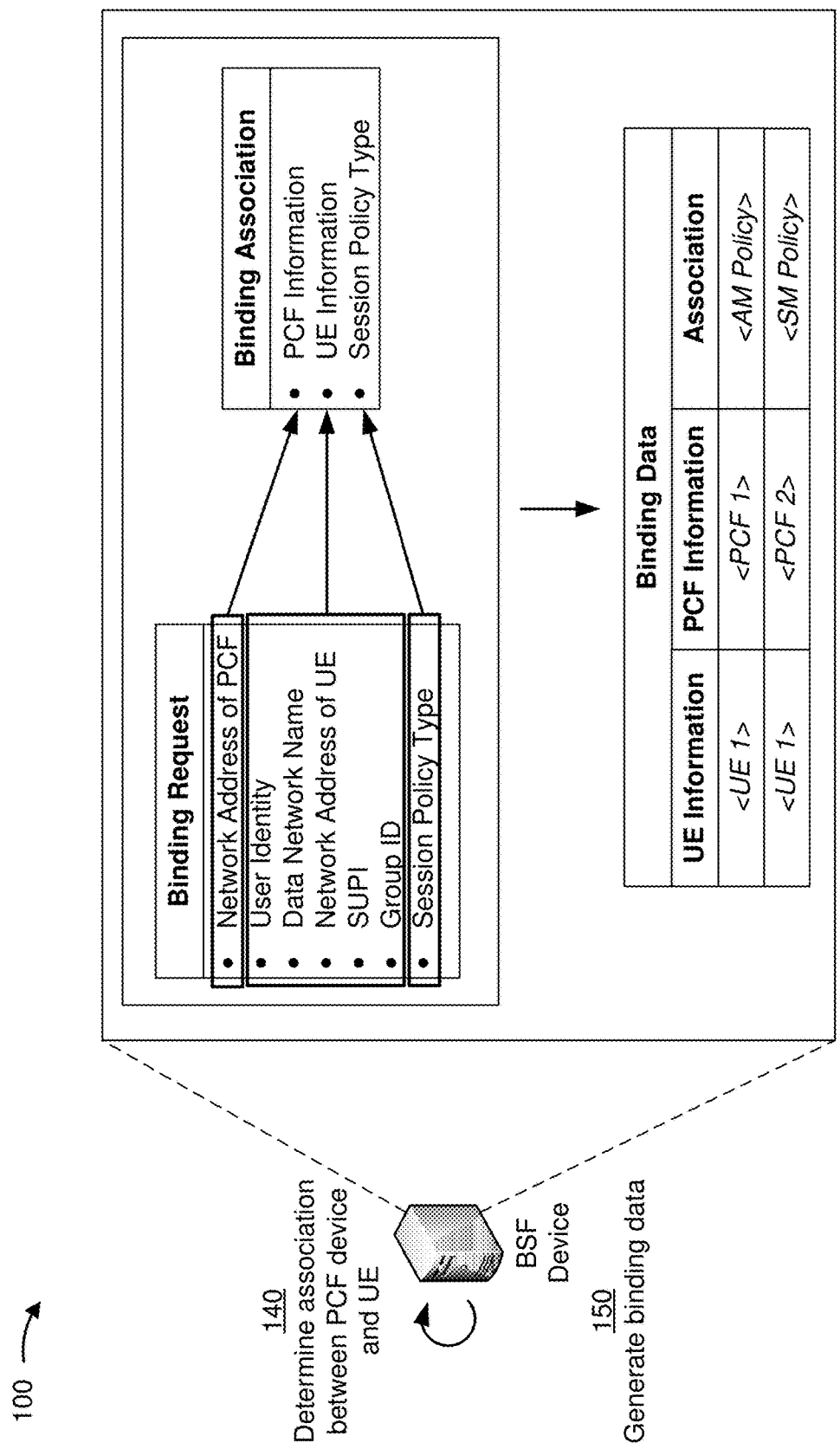

The following detailed description of example implementations refers to the accompanying drawings. The same reference numbers in different drawings may identify the same or similar elements.

In a wireless telecommunications system, such as a 5G/NR wireless telecommunications network, a radio access network (RAN) may include a base station and manage radio access resources to facilitate a communications session between a user equipment (UE) and a core network associated with the wireless telecommunications system. In some instances, the RAN can define and apply a set of policies to the communications session to try to provide an optimal allocation of the radio access resources to support the communications session. For example, upon registering and authenticating a UE in a RAN, an access and mobility function (AMF) device of the RAN may transmit a request to a policy control function (PCF) device to create an access and mobility policy for the UE (e.g., a policy relating to a service area restriction, a list of allowed tracking area identifiers (TAIs), a list of disallowed TAIs, a radio access technology frequency selection priority (RFSP) index, and/or or the like). Furthermore, a session management function (SMF) device of the RAN may transmit a request to a PCF device to create a session management policy for the UE (e.g., a policy relating to a protocol data unit (PDU) session of the UE, a requirement of the PDU session, and/or the like).

In some cases, an application function (AF) device, a network exposure function (NEF) device, and/or another network device may communicate with a PCF device for purposes of applying and/or modifying a requirement of a session policy of a UE (e.g., an access and mobility policy of the UE, a session management policy of the UE, and/or the like). If multiple and separately addressable PCF devices have been deployed, the AF device and/or the NEF device may need to first identify the particular PCF device used to create the session policy for the UE. In some cases, the AF device and/or the NEF device may have access to information for identifying the PCF device that was selected by the SMF device and used to create a session management policy for the UE. Based on such information, the AF device or the NEF device may be able to communicate with the PCF device to apply and/or modify a requirement of the session management policy of the UE. However, the PCF device that was selected by the SMF device to create the session management policy of the UE may be different from the PCF device that was selected by the AMF device to create the access and mobility policy of the UE. In such cases, the AF device and/or the NEF device may be unable to readily identify the PCF device selected by the AMF device and control the access and mobility policy of the UE.

In some cases, a RAN may support a group of UEs (e.g., a group of machine-to-machine (M2M) devices and/or the like). For example, a set of session policies (e.g., access and mobility policies, session management policies, and/or the like) may be applied to the group of UEs by a corresponding set of PCF devices. In order to apply and/or modify a requirement of a session policy of the group of UEs using current solutions, the AF device and/or the NEF device may need to individually identify the individual PCF devices used to create the access and mobility policy, the session management policy, and/or another session policy for the individual UEs. Such a process can be inefficient, cumbersome, and prone to error and delay, which can further result in congested network traffic, dropped connections, and unintended downtime. There is currently no mechanism that enables the AF device and/or the NEF device to reference the group of UEs using a group identifier and/or to identify the set of respective PCF devices used to create session management policies for the group of UEs in a single request. Furthermore, there is no mechanism that enables the AF device or the NEF device to identify the set of respective PCF devices used to create access and mobility policies for the group of UEs.

Some implementations described herein provide a binding support function (BSF) device that enables individual PCF devices associated with individual UEs, or a set of PCF devices associated with a group of UEs, to be indexed by a network device (e.g., an AF device, an NEF device, and/or the like) for purposes of modifying an access and mobility policy and/or a session management policy. In particular, the BSF device may receive a binding request from a PCF device that was used to create a session policy for a UE, determine an association between the PCF device and the UE based on the binding request, generate binding data for the UE based on the association between the PCF device and the UE, assign a binding identifier to the binding data, and cause an action to be performed in connection with the binding data and/or the binding identifier. In some examples, the BSF device may provide an indexable data structure storing one or more sets of binding data associated with one or more UEs, and enable a network device to query information identifying a PCF device or a set of PCF devices used to create one or more session policies (e.g., access and mobility policies, session management policies, and/or the like). In some examples, the BSF device may respond to a query with a binding identifier associated with a UE, a list of binding identifiers associated with a group of UEs, a network address of a PCF device associated with a UE, a list of network addresses of a set of PCF devices associated with a group of UEs, and/or the like.

In this way, the BSF device may facilitate an ability of network devices (e.g., AF devices, NEF devices, and/or the like) to identify an appropriate PCF device associated with a UE or to identify a set of PCF devices associated with a group of UEs. The BSF device may maintain a record of associations between UEs and PCF devices for different types of session policies, which can be used by an AF device and/or an NEF device to promptly and reliably apply and/or modify requirements for access and mobility policies, session management policies, and/or the like. The BSF device may also register associations between a group of UEs and a set of PCF devices using group identifiers to further facilitate control of grouped session policy requirements. By facilitating session policy control between UEs, AF devices, and NEF devices, the BSF device may help optimize network connectivity, optimize network traffic, and reduce service interruptions between interconnected network devices. With optimized network connections and better policy control, network devices may be operated more efficiently and maintained in optimal working conditions. The BSF device may further conserve computational and/or network resources that may otherwise be used to control access and mobility policies and/or session management policies in a wireless network.

FIGS. 1A-1D are diagrams of one or more example implementations 100 described herein. As shown in FIGS. 1A-1D, the example implementation(s) 100 may include one or more UEs, an AMF device, an SMF device, one or more PCF devices, a BSF device, an AF device, an NEF device, and a data structure. FIGS. 1A-1D present one or more functions that may be performed by the BSF device to bind a session policy of the UE in a wireless network. For example, the BSF device may receive a binding request from a PCF device, determine an association between the PCF device and a UE based on the binding request, generate binding data for the UE based on the association between the PCF device and the UE, assign a binding identifier to the binding data, and cause an action to be performed in connection with the binding data and/or the binding identifier. In some examples, the BSF device may provide an indexable data structure storing one or more sets of binding data associated with one or more UEs. In some examples, the BSF device may enable the AF device and/or the NEF device to query information identifying the PCF device or a set of the PCF devices used to create one or more session policies (e.g., access and mobility policies, session management policies, and/or the like).

As shown in FIG. 1A, and by reference number 110, a UE may initiate registration and authentication in a wireless network via an AMF device and an SMF device. For example, the UE may transmit a registration request to the AMF device and a session request to the SMF device. The registration request may request the AMF device to register and authenticate the UE with the wireless network (e.g., via a RAN of the wireless network associated with the AMF device). The registration request may include information relating to a user identity associated with the UE, a data network name associated with the UE, a subscription permanent identifier (SUPI) of the UE, and/or the like. In some examples, the registration request may include a group identifier of a group of UEs (e.g., a group of M2M devices and/or the like). The session request may request the SMF device to establish a PDU session for the UE. The session request may include information relating to a user identity associated with the UE, a data network name associated with the UE, a SUPI of the UE, a preferred network of the UE, a request type, a session management capability of the UE, and/or the like. In some examples, the session request may include a group identifier of a group of UEs (e.g., a group of M2M devices and/or the like).

As further shown in FIG. 1A, and by reference number 120, the AMF device and the SMF device may create a session policy for the UE. For example, the AMF device may select a PCF device and transmit a policy request to the PCF device to request an access and mobility policy for the UE based on the registration request, and the SMF device may select a PCF device and transmit a policy request to the PCF device to request a session management policy for the UE based on the session request. In some examples, the PCF device selected by the AMF device may be the same or different from the PCF device selected by the SMF device. The PCF device selected by the AMF device may determine an access and mobility policy for the UE, and return the access and mobility policy to the AMF device. The access and mobility policy may include information relating to a service area restriction of the UE, a list of allowed TAIs for the UE, a list of disallowed TAIs for the UE, an RFSP index that applies to the UE, and/or the like. The PCF device selected by the SMF device may determine a session management policy for the UE, and return the session management policy to the SMF device to establish the PDU session for the UE. The session management policy may include information relating to a PDU session identifier, a requirement of the PDU session for the UE, a network address (e.g., an Internet protocol (IP) address and/or a medium access control (MAC) address) of the UE, and/or the like.

As further shown in FIG. 1A, and by reference number 130, a BSF device may receive a binding request from a PCF device requesting the BSF device to register an association between the PCF device and the UE. For example, the PCF device used to create a session policy (e.g., an access and mobility policy, a session management policy, and/or the like) for the UE may request to be associated with the corresponding UE such that an AF device, an NEF device, and/or another network device needing to apply and/or modify a requirement of the session policy is able to identify the appropriate PCF device. In some examples, the PCF device selected by the AMF device may be different from the PCF device selected by the SMF device. In such cases, the BSF device may receive a binding request from the PCF device (e.g., the PCF device used to create the access and mobility policy) to register an association between the PCF device, the UE, the AMF device, and/or the access and mobility policy created for the UE. Similarly, the BSF device may receive a binding request from the PCF device (e.g., the PCF device used to create the session management policy) to register an association between the PCF device, the UE, the SMF device, and/or the session management policy created for the UE.

In some implementations, the binding request may include information relating to the UE (e.g., information relating to a user identity associated with the UE, a data network name associated with the UE, a SUPI of the UE, and/or the like). Additionally, or alternatively, if available to the PCF device, the binding request may include a network address of the UE (e.g., an IP address of the UE, a MAC address of the UE, and/or other information sufficient for distinguishing the UE from other UEs connected to the wireless network). In some examples, such as when the UE is associated with a group of UEs (e.g., a group of M2M devices and/or the like), the binding request may include a group identifier (e.g., a Group ID) associated with the group of UEs. In some examples, the binding request may include information relating to the PCF device used to create the session policy for the UE. For example, the binding request may include information relating to a network address of the PCF device, a type of the session policy generated by the PCF device, and/or another identifier capable of distinguishing the PCF device from other PCF devices available within the wireless network.

As shown in FIG. 1B, and by reference number 140, the BSF device may determine an association between the PCF device and the corresponding UE based on the binding request. For example, the BSF device may use the binding request to determine information relating to the PCF device providing the binding request, the UE for which the PCF device created a session policy, and/or the like. In some examples, the BSF device may determine information for identifying the PCF device based on an origin of the binding request, the network address of the PCF device, and/or other information that may be available in the binding request. The BSF device may determine information for identifying the UE based on a user identity associated with the UE, a network address of the UE, a SUPI of the UE, and/or other information that may be available in the binding request. In some examples, such as when the UE is associated with a group of UEs (e.g., a group of M2M devices and/or the like), the BSF device may identify the UE based on a group identifier (e.g., a Group ID) that may be provided in the binding request. In some examples, the BSF device may determine a type of the session policy that was created by the PCF device (e.g., whether the session policy is an access and mobility policy or a session management policy) based on information included in the binding request.

As further shown in FIG. 1B, and by reference number 150, the BSF device may generate binding data based on the association between the PCF device and the UE. For example, the binding data may include information identifying the PCF device, the UE, the session policy type (e.g., whether the session policy is an access and mobility policy or a session management policy), and/or another association between the PCF device and the UE that can be used to identify the PCF device. As shown for the example in FIG. 1B, the binding data may include a first entry corresponding to an association between the UE (e.g., UE 1) and one of the PCF devices (e.g., PCF 1) used to create an access and mobility (AM) policy for the UE, and a second entry corresponding to an association between the UE and another one of the PCF devices (e.g., PCF 2) used to create a session management (SM) policy for the UE. In some examples, the binding data may include a user identity associated with the UE, a network address of the UE, a data network name associated with the UE, a SUPI of the UE, a network address of the PCF device, and/or another indicator that may enable an AF device, an NEF device, and/or another network device to identify the PCF device associated with the UE. In some examples, such as when the UE is associated with a group of UEs (e.g., a group of M2M devices and/or the like), the BSF device may generate the binding data to include a group identifier referencing the group of UEs.

Figure 1C:
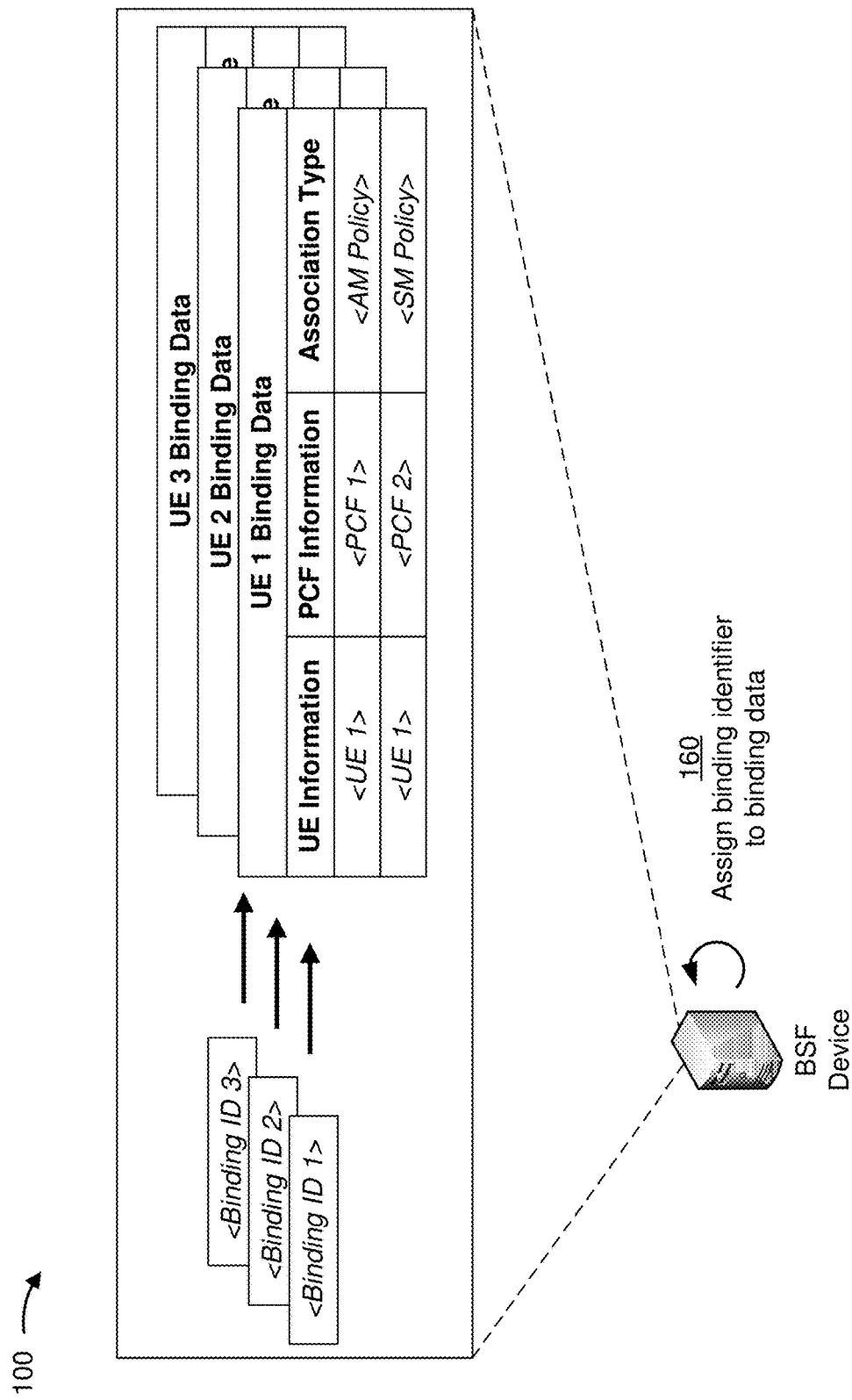

As shown in FIG. 1C, and by reference number 160, the BSF device may assign a binding identifier to the binding data. In some examples, the binding identifier may be specific to a UE. For example, the binding identifier may be used by a network device (e.g., an AF device, an NEF device, and/or the like) to index the binding data associated with the UE and identify a PCF device associated with the UE. As shown for the example in FIG. 1C, a first binding identifier (e.g., Binding ID 1) may be assigned to the binding data associated with a first UE (e.g., UE 1 Binding Data), a second binding identifier (e.g., Binding ID 2) may be assigned to the binding data associated with a second UE (e.g., UE 2 Binding Data), and so on. In some examples, the binding identifier may be specific to a session policy of a UE. For example, the BSF device may assign a binding identifier to binding data corresponding to a PCF device used to create an access and mobility policy for the UE and assign another binding identifier to binding data corresponding to a PCF device used to create a session management policy for the UE. In some examples, the BSF device may assign a binding identifier to a set of binding data corresponding to a group of UEs (e.g., a group of M2M devices and/or the like). In such cases, the binding identifier may be used by an AF device, an NEF device, and/or another network device to index a list of PCF devices (e.g., a list of respective network addresses of the PCF devices) associated with the group of UEs.

Figure 1D:
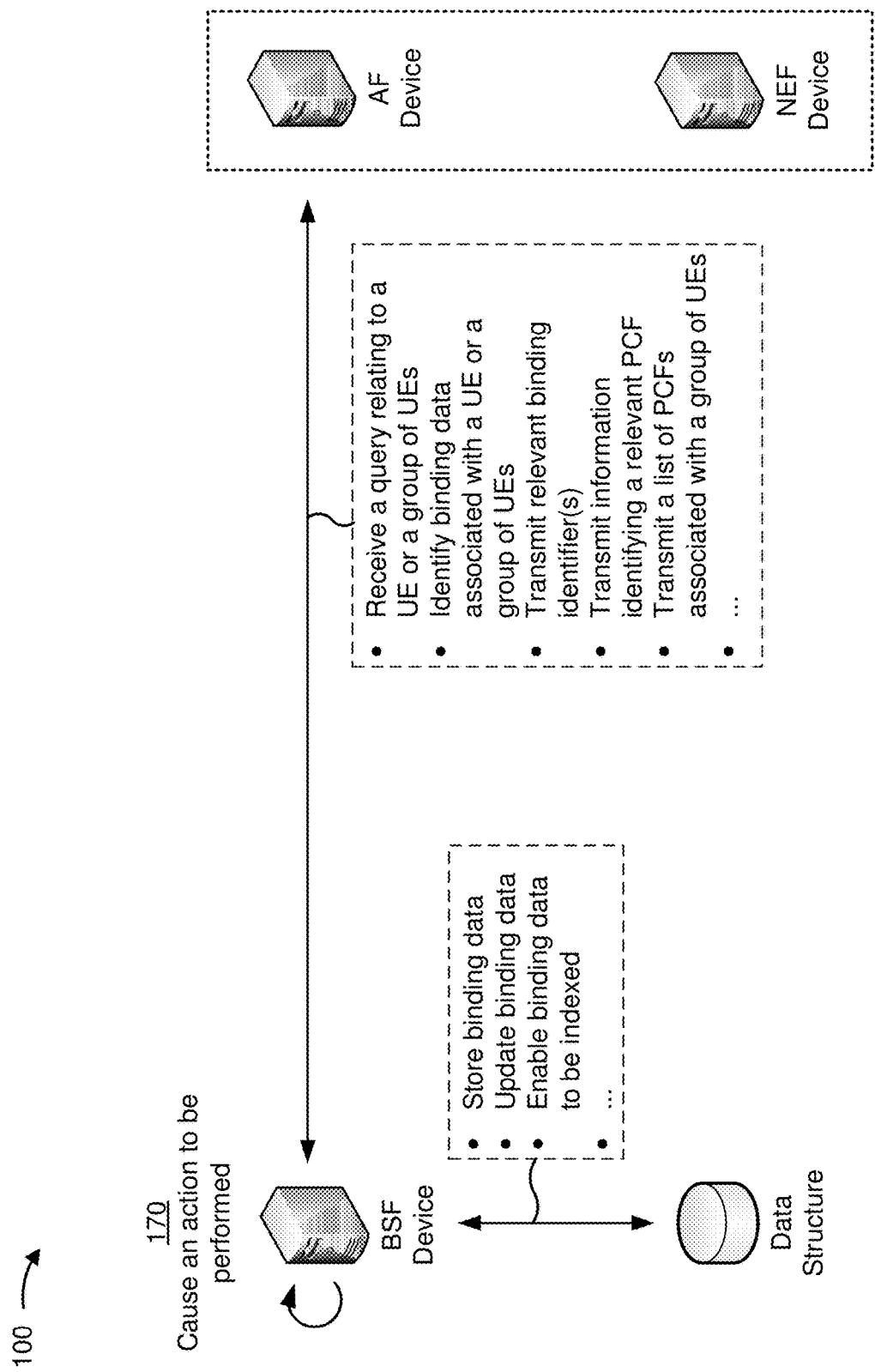

As shown in FIG. 1D, and by reference number 170, the BSF device may cause an action to be performed in connection with the binding identifier and/or the binding data. In some examples, the BSF device may maintain and/or access a data structure that stores binding data generated for a UE that has been registered and authorized with the wireless network. The data structure may be disposed within the BSF device, provided separately from the BSF device, and/or otherwise made accessible to the BSF device. The data structure may store binding data generated by the BSF device and/or binding data generated by another BSF device within the wireless network. In some examples, the BSF device may update the data structure (e.g., store binding data of a UE that has been recently registered with the wireless network, remove binding data of a UE that has been recently removed from the wireless network, and/or the like). In some examples, the BSF device may enable the binding data of a UE to be indexed, identified, recalled, and/or otherwise accessed by another network device (e.g., an AF device, an NEF device, and/or the like). For example, the BSF device may enable binding data within the data structure to be indexed using a binding identifier, a user identity associated with the UE, a network address of the UE, a data network name associated with the UE, a SUPI of the UE, a group identifier of a group of UEs associated with the UE, and/or the like.

In some implementations, the BSF device may receive a query relating to a UE from the AF device, the NEF device, and/or another network device. The query may request information for identifying a PCF device associated with the UE (e.g., the PCF device used to create an access and mobility policy for the UE, the PCF device used to create a session management policy for the UE, and/or the like). The query may include a user identity associated with the UE, a network address of the UE, a data network name associated with the UE, a SUPI of the UE, and/or the like. The BSF device may identify the binding data based on the query, and transmit the binding data, the associated binding identifier, and/or other information that can be used by the network device to identify the corresponding PCF device. In some examples, the query may relate to a binding identifier, such as if the binding identifier is available to the network device requesting the PCF device information. In some examples, the query may include a group identifier corresponding to a group of UEs (e.g., a group of M2M devices and/or the like). Based on the group identifier, the BSF device may identify respective binding data of the UEs associated with the group identifier, identify a set of PCF devices associated with the UEs, and transmit a list identifying the PCF devices (e.g., a list of respective network addresses of the PCF devices) to the network device submitting the query.

In such a way, the BSF device may facilitate an ability of network devices (e.g., AF devices, NEF devices, and/or the like) to identify an appropriate PCF device associated with a UE or to identify a set of PCF devices associated with a group of UEs. The BSF device may maintain a record of associations between UEs and PCF devices for different types of session policies, which can be used by an AF device and/or an NEF device to promptly and reliably apply and/or modify requirements for access and mobility policies, session management policies, and/or the like. The BSF device may also register associations between a group of UEs and a set of PCF devices using group identifiers to further facilitate control of grouped session policy requirements. By facilitating session policy control between UEs, AF devices, and NEF devices, the BSF device may help optimize network connectivity, optimize network traffic, and reduce service interruptions between interconnected network devices. With optimized network connections and better policy control, network devices may be operated more efficiently and maintained in optimal working conditions. The BSF device may further conserve computational and/or network resources that may otherwise be used to control access and mobility policies and/or session management policies in a wireless network.

As indicated above, FIGS. 1A-1D are provided as one or more examples. Other examples can differ from what is described with regard to FIGS. 1A-1D. For example, in some implementations, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) in implementation(s) 100 may perform one or more functions described as being performed by another set of devices in implementation(s) 100.

Figure 2:
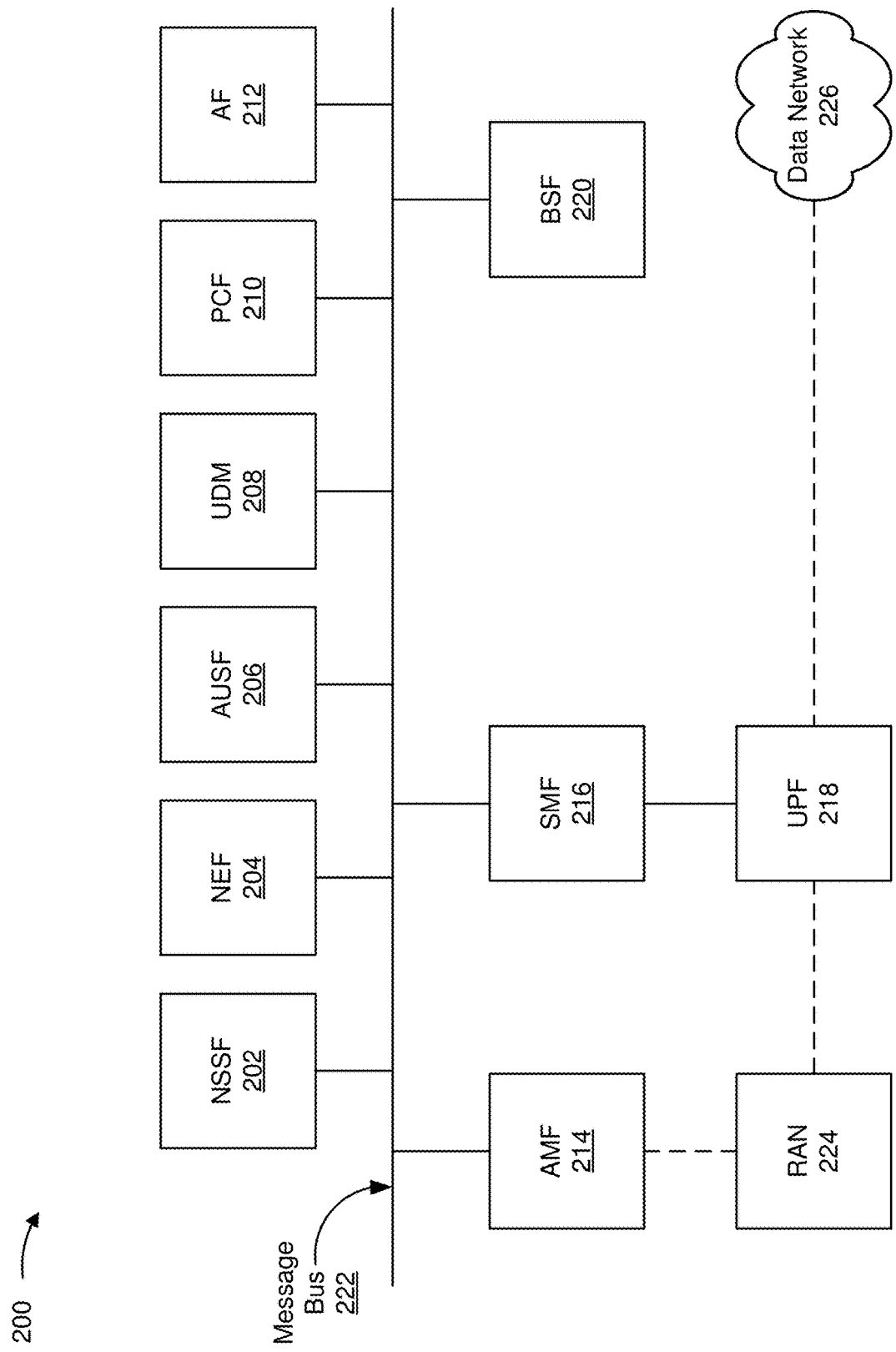
FIG. 2 is a diagram of an example functional architecture of an example core network described herein.

FIG. 2 is a diagram of an example functional architecture of a core network 200 in which systems and/or methods described herein can be implemented. For example, FIG. 2 shows an example functional architecture of a 5G next generation core network (NG Core) included in a 5G wireless telecommunications system. In some implementations, the example functional architecture can be implemented by a core network (e.g., a core network described with respect to FIG. 3) and/or one or more of devices (e.g., a device described with respect to FIG. 4). While the example functional architecture of core network 200 shown in FIG. 2 can be an example of a service-based architecture, in some implementations, core network 200 can be implemented as a reference-point architecture.

As shown in FIG. 2, core network 200 can include a number of functional elements. The functional elements can include, for example, an NSSF 202, an NEF 204, an authentication server function (AUSF) 206, a unified data management (UDM) 208, a PCF 210, an AF 212, an AMF 214, an SMF 216, a user plane function (UPF) 218, and a BSF 220. These functional elements can be communicatively connected via a message bus 222, which can comprise one or more physical communication channels and/or one or more virtual communication channels. Each of the functional elements shown in FIG. 2 can be implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 200 can be operatively connected to a RAN 224, a data network 226, and/or the like, via wired and/or wireless connections with UPF 218.

NSSF 202 can select network slice instances for UEs, where NSSF 202 can determine a set of network slice policies to be applied at the RAN 224. By providing network slicing, NSSF 202 allows an operator to deploy multiple substantially independent end-to-end networks potentially with the same infrastructure. In some implementations, each slice can be customized for different services. NEF 204 can support the exposure of capabilities and/or events in the wireless telecommunications system to help other entities in the wireless telecommunications system discover network services and/or utilize network resources efficiently.

AUSF 206 can act as an authentication server and support the process of authenticating UEs in the wireless telecommunications system. UDM 208 can store subscriber data and profiles in the wireless telecommunications system. UDM 208 can be used for fixed access, mobile access, and/or the like, in core network 200. PCF 210 can provide a policy framework that incorporates network slicing, roaming, packet processing, mobility management, and/or the like.

AF 212 can determine whether UEs provide preferences for a set of network slice policies and support application influence on traffic routing, access to NEF 204, policy control, and/or the like. AMF 214 can provide authentication and authorization of UEs. SMF 216 can support the establishment, modification, and release of communications sessions in the wireless telecommunications system. For example, SMF 216 can configure traffic steering policies at UPF 218, enforce UE IP address allocation and policies, and/or the like. AMF 214 and SMF 216 can act as a termination point for Non Access Stratum (NAS) signaling, mobility management, and/or the like. SMF 216 can act as a termination point for session management related to NAS. RAN 224 can send information (e.g. the information that identifies the UE) to AMF 214 and/or SMF 216 via PCF 210.

UPF 218 can serve as an anchor point for intra/inter Radio Access Technology (RAT) mobility. UPF 218 can apply rules to packets, such as rules pertaining to packet routing, traffic reporting, handling user plane Quality of Service (QoS), and/or the like. UPF 218 can determine an attribute of application-specific data that is communicated in a communications session. UPF 218 can receive information (e.g., the information that identifies the communications attribute of the application) from RAN 224 via SMF 216 or an application programming interface (API). Message bus 222 represents a communication structure for communication among the functional elements. In other words, message bus 222 can permit communication between two or more functional elements. Message bus 222 can be a message bus, a Hypertext Transfer Protocol/2 (HTTP/2) proxy server, and/or the like.

BSF 220 can register, update, and/or remove an association between PCF 210 and a UE. For example, BSF 220 can receive a binding request from PCF 210 used to create a session policy for the UE, determine an association between PCF 210 and the UE based on the binding request, generate binding data for the UE based on the association between PCF 210 and the UE, assign a binding identifier to the binding data, and cause an action to be performed in connection with the binding data and/or the binding identifier. BSF 220 can store one or more sets of binding data associated with one or more UEs, and enable AF 212 and/or NEF 204 to query information identifying PCF 210 that was used to create an access and mobility policy, a session management policy, and/or another session policy for the UE. BSF 220 can respond to a query with a binding identifier associated with a UE, a list of binding identifiers associated with a group of UEs, a network address of PCF 210 associated with the UE, a list of network addresses of a set of PCFs 210 associated with a group of UEs, and/or the like.

RAN 224 can include a base station and be operatively connected, via a wired and/or wireless connection, to the core network 200 through UPF 218. RAN 224 can facilitate communications sessions between UEs and data network 226 by communicating application-specific data between RAN 224 and core network 200. Data network 226 can include various types of data networks, such as the Internet, a third party services network, an operator services network, a private network, a wide area network, and/or the like.

The number and arrangement of functional elements shown in FIG. 2 are provided as an example. In practice, there can be additional functional elements, fewer functional elements, different functional elements, or differently arranged functional elements than those shown in FIG. 2. Furthermore, two or more functional elements shown in FIG. 2 can be implemented within a single device, or a single functional element shown in FIG. 2 can be implemented as multiple, distributed devices. Additionally, or alternatively, a set of functional elements (e.g., one or more functional elements) of core network 200 can perform one or more functions described as being performed by another set of functional elements of core network 200.

Figure 3:
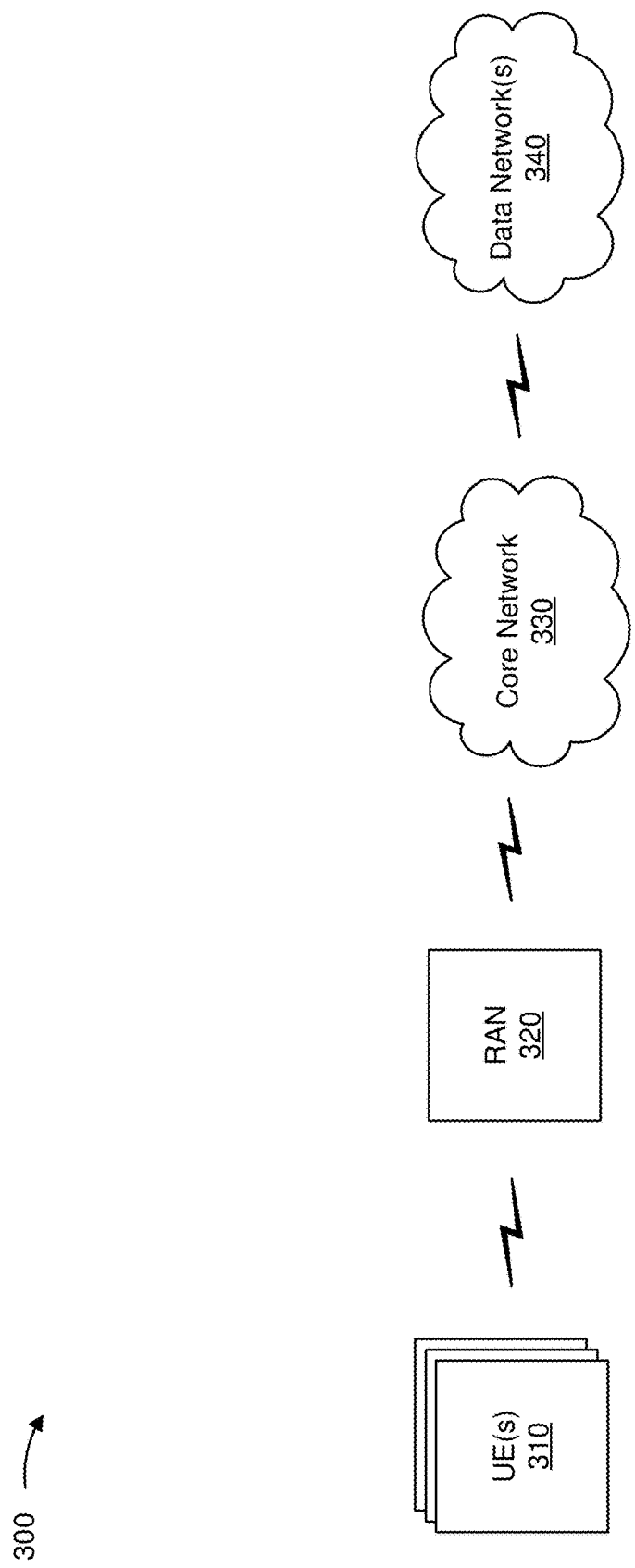
FIG. 3 is a diagram of an example environment in which systems, functional architectures, and/or methods described herein can be implemented.

FIG. 3 is a diagram of an example environment 300 in which systems and/or methods described herein can be implemented. As shown in FIG. 3, environment 300 can include a UE 310, a RAN 320, a core network 330, and a data network 340. Devices of environment 300 can interconnect via wired connections, wireless connections, or a combination of wired and wireless connections.

UE 310 can include one or more devices capable of communicating with RAN 320 and/or a data network 340 (e.g., via core network 330). For example, UE 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 310 can be capable of communicating using uplink (e.g., UE to RAN) communications, downlink (e.g., RAN to UE) communications, and/or sidelink (e.g., M2M) communications. In some implementations, UE 310 can include a machine-type communication (MTC) UE, such as an evolved or enhanced MTC (eMTC) UE. In some implementations, UE 310 can include an Internet of Things (IoT) UE, such as a narrowband IoT (NB-IoT) UE and/or the like.

RAN 320 can include one or more devices capable of communicating with UE 310 using a RAT. For example, RAN 320 can include a base station, a base transceiver station, a radio base station, a 5G next generation NodeB (gNodeB or gNB), an LTE evolved NodeB (eNodeB or eNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, a base station has the same characteristics and functionality of the RAN 320, and vice versa. RAN 320 can transfer traffic between UE 310 (e.g., using a RAT), RANs 320 (e.g., using a wireless interface or a backhaul interface, such as a wired backhaul interface), and/or core network 330. RAN 320 can provide one or more cells that cover geographic areas. Some RANs 320 can be mobile base stations. Some RANs 320 can be capable of communicating using multiple RATs.

In some implementations, RAN 320 can perform scheduling and/or resource management for UEs 310 covered by RAN 320 (e.g., UEs 310 covered by a cell provided by RAN 320). In some implementations, RAN 320 can be controlled or coordinated by a network controller, which can perform load balancing, network-level configuration, and/or the like. The network controller can communicate with RAN 320 via a wireless or wireline backhaul. In some implementations, RAN 320 can include a network controller, a self-organizing network (SON) module or component, or a similar module or component. In other words, RAN 320 can perform network control, scheduling, and/or network management functions (e.g., for other RANs 320 and/or for uplink, downlink, and/or sidelink communications of UEs 310 covered by RAN 320). In some implementations, RAN 320 can apply network slice policies to perform the network control, scheduling, and/or network management functions. In some implementations, RAN 320 can include a central unit and multiple distributed units. The central unit can coordinate access control and communication with regard to the multiple distributed units. The multiple distributed units can provide UEs 310 and/or other RANs 320 with access to data network 340 via core network 330.

Core network 330 can include various types of core network architectures, such as a 5G NG Core (e.g., core network 200 of FIG. 2), an LTE evolved packet core (EPC), and/or the like. In some implementations, core network 330 can be implemented on physical devices, such as a gateway, a mobility management entity, and/or the like. In some implementations, the hardware and/or software implementing core network 330 can be virtualized (e.g., through the use of network function virtualization and/or software-defined networking), thereby allowing for the use of composable infrastructure when implementing core network 330. In this way, networking, storage, and compute resources can be allocated to implement the functions of core network 330 (described in FIG. 2) in a flexible manner as opposed to relying on dedicated hardware and software to implement these functions.

Data network 340 can include one or more wired and/or wireless data networks. For example, data network 340 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
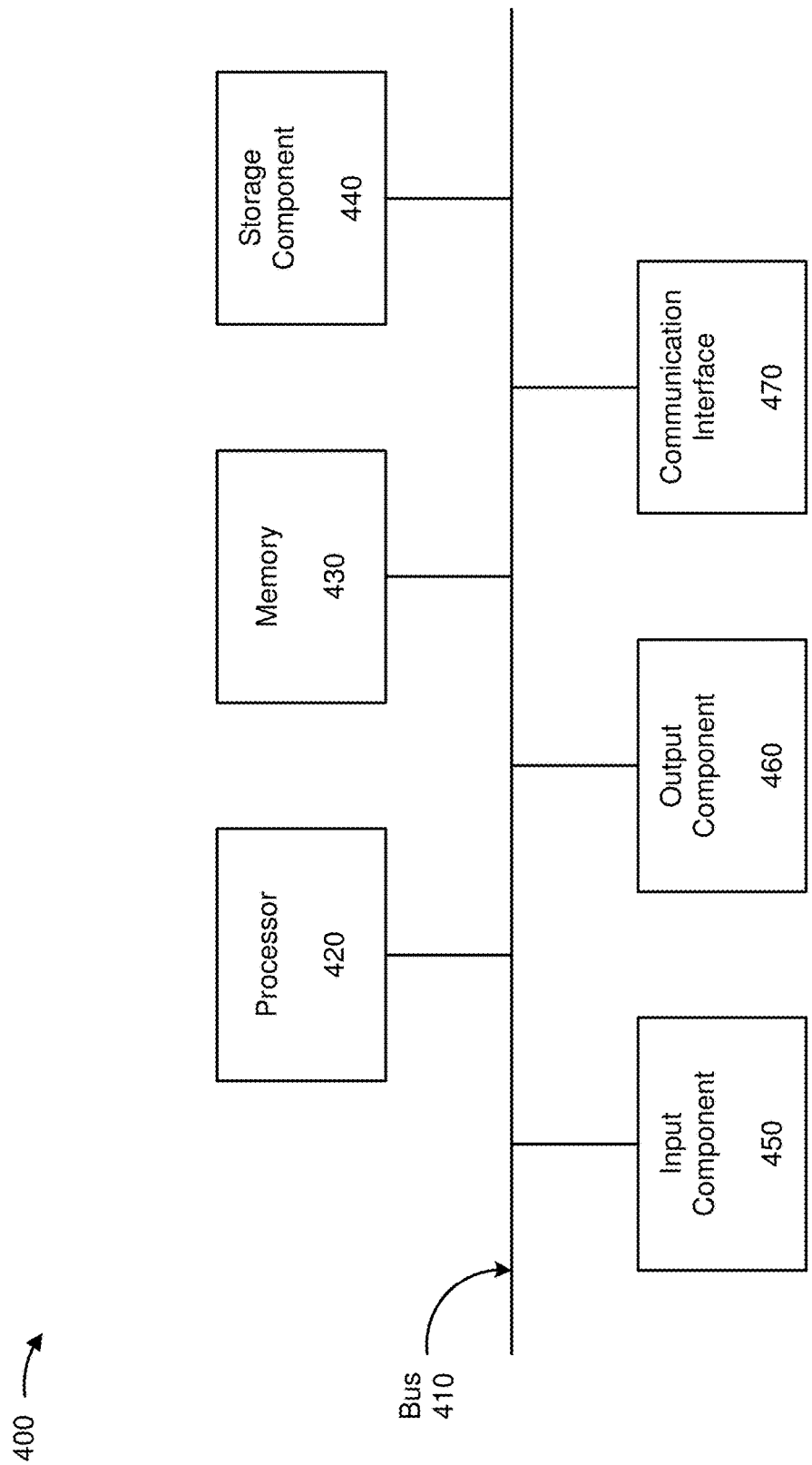
FIG. 4 is a diagram of example components of one or more devices of FIGS. 2 and 3.

FIG. 4 is a diagram of example components of a device 400. Device 400 can correspond to, or can implement, one or more functional elements of core network 200, UE 310, a base station of RAN 320, one or more functional elements or devices of core network 330, and/or a device of data network 340. In some implementations, one or more functional elements of core network 200, UE 310, a base station of RAN 320, one or more functional elements or devices of core network 330, and/or a device of data network 340 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
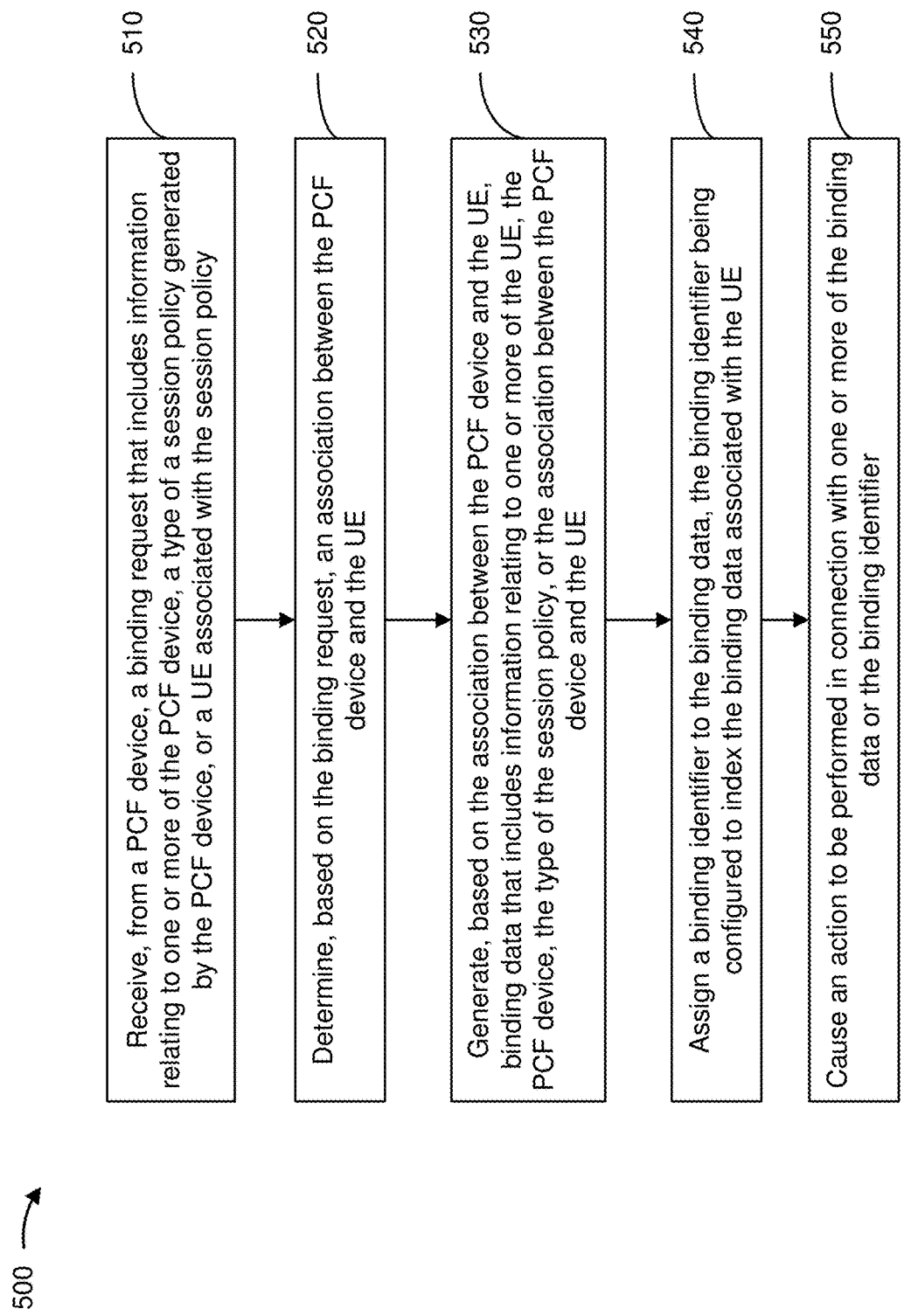
FIG. 5 is a flow chart of an example process for managing and allocating a binding service in a wireless network.

FIG. 5 is a flow chart of an example process for managing and allocating a binding service in a wireless network. In some implementations, one or more process blocks of FIG. 5 can be performed by a BSF device (e.g., BSF 220). In some implementations, one or more process blocks of FIG. 5 can be performed by another device or a group of devices separate from or including the BSF device, such as a base station of a RAN (e.g., RAN 320), another component in a core network (e.g., core network 200, core network 330, and/or the like), a UE (e.g., UE 310), and/or the like.

As shown in FIG. 5, process 500 may include receiving, from a PCF device, a binding request that includes information relating to one or more of the PCF device, a type of a session policy generated by the PCF device, or a UE associated with the session policy (block 510). For example, the BSF device (e.g., using a processor 420, a memory 430, a storage component 440, an input component 450, an output component 460, a communication interface 470, and/or the like) may receive, from a PCF device, a binding request, as described above. In some implementations, the binding request may include information relating to one or more of the PCF device, a type of a session policy generated by the PCF device, or a UE associated with the session policy. In some examples, the binding request may include information relating to a user identity associated with the UE, a data network name associated with the UE, a SUPI of the UE, and/or the like. Additionally, or alternatively, if available to the PCF device, the binding request may include a network address of the UE and/or other information sufficient for distinguishing the UE from other UEs. In some examples, such as when the UE is associated with a group of UEs, the binding request may include a group identifier associated with the group of UEs. In some examples, the binding request may include information relating to a network address of the PCF device and/or another identifier capable of distinguishing the PCF device from other PCF devices.

As further shown in FIG. 5, process 500 may include determining, based on the binding request, an association between the PCF device and the UE (block 520). For example, the BSF device (e.g., using a processor 420, a memory 430, a storage component 440, an input component 450, an output component 460, a communication interface 470, and/or the like) may determine, based on the binding request, an association between the PCF device and the UE, as described above. In some implementations, the BSF device may use the binding request to determine information relating to the PCF device providing the binding request, the UE for which the PCF device created a session policy, and/or the like. In some examples, the BSF device may determine information for identifying the PCF device based on an origin of the binding request, the network address of the PCF device, and/or other information that may be available in the binding request. The BSF device may determine information for identifying the UE based on a user identity associated with the UE, a network address of the UE, a SUPI of the UE, and/or other information that may be available in the binding request. In some examples, such as when the UE is associated with a group of UEs, the BSF device may identify the UE based on a group identifier that may be provided in the binding request. In some examples, the BSF device may determine a type of the session policy that was created by the PCF device based on information included in the binding request.

As further shown in FIG. 5, process 500 may include generating, based on the association between the PCF device and the UE, binding data that includes information relating to one or more of the UE, the PCF device, the type of the session policy, or the association between the PCF device and the UE (block 530). For example, the BSF device (e.g., using a processor 420, a memory 430, a storage component 440, an input component 450, an output component 460, a communication interface 470, and/or the like) may generate, based on the association between the PCF device and the UE, binding data, as described above. In some implementations, the binding data may include information relating to one or more of the UE, the PCF device, the type of the session policy, or the association between the PCF device and the UE. In some examples, the binding data may include information identifying the PCF device, the UE, the session policy type, and/or another association between the PCF device and the UE that can be used to identify the PCF device. In some examples, the binding data may include a user identity associated with the UE, a network address of the UE, a data network name associated with the UE, a SUPI of the UE, a network address of the PCF device, and/or another indicator that may enable an AF device, an NEF device, and/or another network device to identify the PCF device associated with the UE. In some examples, such as when the UE is associated with a group of UEs, the BSF device may generate the binding data to include a group identifier referencing the group of UEs.

As further shown in FIG. 5, process 500 may include assigning a binding identifier to the binding data, the binding identifier being configured to index the binding data associated with the UE (block 540). For example, the BSF device (e.g., using a processor 420, a memory 430, a storage component 440, an input component 450, an output component 460, a communication interface 470, and/or the like) may assign a binding identifier to the binding data, as described above. In some implementations, the binding identifier may index the binding data associated with the UE. In some examples, the binding identifier may be specific to the UE and/or specific to a session policy of the UE. In some examples, the BSF device may assign a binding identifier to a set of binding data corresponding to a group of UEs (e.g., a group of M2M devices and/or the like). In such cases, the binding identifier may be used by an AF device, an NEF device, and/or another network device to index a list of PCF devices (e.g., a list of respective network addresses of the PCF devices) associated with the group of UEs.

As further shown in FIG. 5, process 500 may include causing an action to be performed in connection with one or more of the binding data or the binding identifier (block 550). For example, the BSF device (e.g., using a processor 420, a memory 430, a storage component 440, an input component 450, an output component 460, a communication interface 470, and/or the like) may cause an action to be performed in connection with one or more of the binding data or the binding identifier, as described above. In some implementations, the BSF device may maintain and/or access a data structure that stores binding data generated for a UE that has been registered and authorized with the wireless network. In some examples, the BSF device may store, update, and/or remove binding data in the data structure and/or enable the binding data of a UE to be indexed, identified, recalled, and/or otherwise accessed by an AF device, an NEF device, and/or another network device. In some examples, the BSF device may enable binding data within the data structure to be indexed using a binding identifier, a user identity associated with the UE, a network address of the UE, a data network name associated with the UE, a SUPI of the UE, a group identifier of a group of UEs associated with the UE, and/or the like.

In some implementations, the BSF device may receive a query relating to a UE from the AF device, the NEF device, and/or another network device. The query may request information for identifying a PCF device used to create an access and mobility policy for the UE, a PCF device used to create a session management policy for the UE, and/or the like. The query may include a user identity associated with the UE, a network address of the UE, a data network name associated with the UE, a SUPI of the UE, and/or the like. The BSF device may identify the binding data based on the query, and transmit the binding data, the associated binding identifier, and/or other information that can be used by the AF device, the NEF device, and/or another network device to identify the corresponding PCF device. In some examples, the query may include a binding identifier if the binding identifier is available to the AF device, the NEF device, and/or another network device requesting the PCF device information. In some examples, the query may include a group identifier corresponding to a group of UEs (e.g., a group of M2M devices and/or the like). Based on the group identifier, the BSF device may identify respective binding data associated with the UEs associated with the group identifier, identify a set of PCF devices associated with the UEs, and transmit a list identifying the PCF devices (e.g., a list of respective network addresses of the PCF devices) to the AF device, the NEF device, and/or another network device requesting the PCF device information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
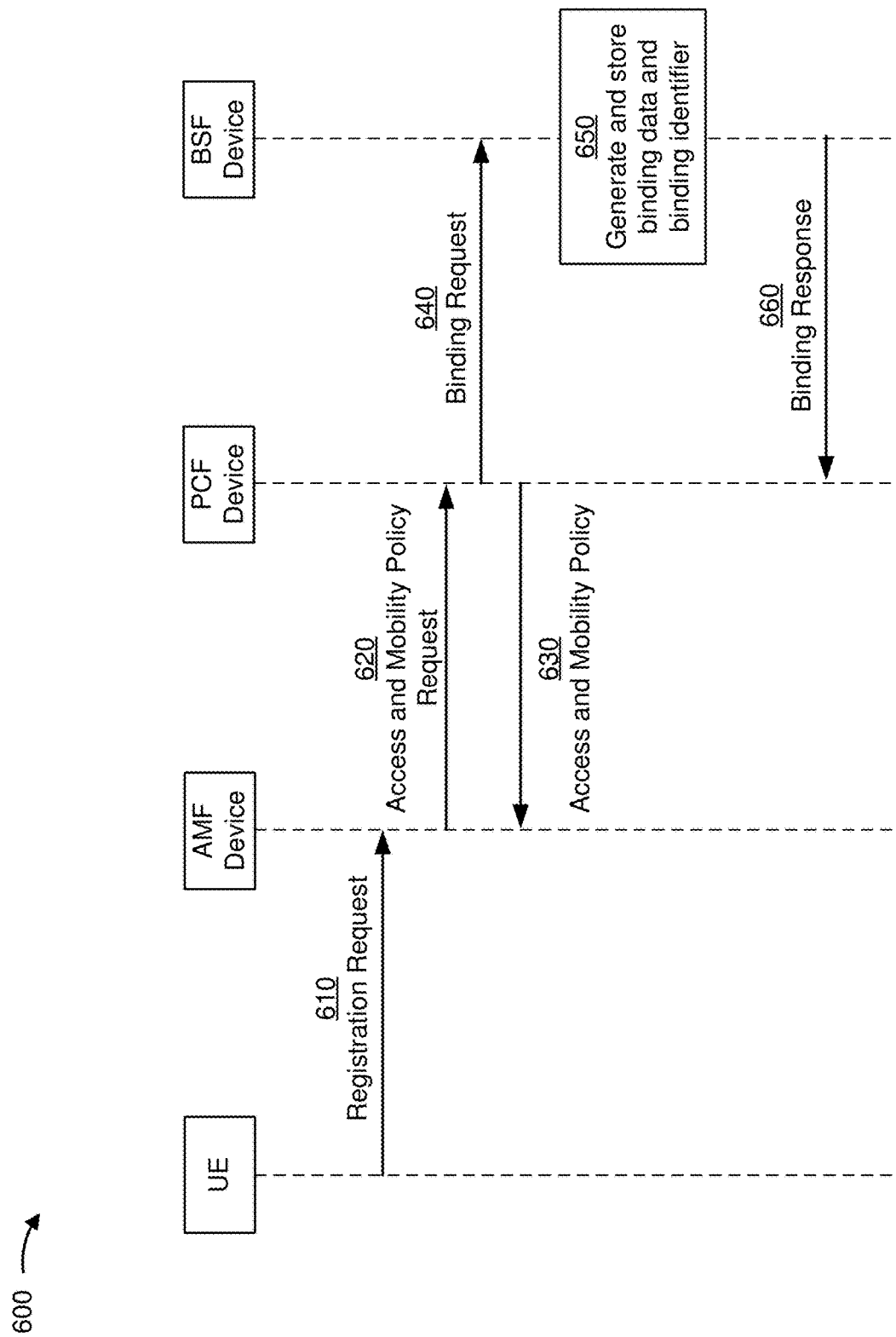
FIG. 6 is a call flow diagram of an example call flow for managing and allocating a binding service in a wireless network.

FIG. 6 is a call flow diagram of an example call flow 600 for managing and allocating a binding service in a wireless network. For example, call flow 600 shows communications between a UE, an AMF device, a PCF device (e.g., a PCF device used to create an access and mobility policy for the UE), and a BSF device that enable an association between the PCF device and the UE to be registered with the BSF device.

As shown in FIG. 6, and by reference number 610, the UE may transmit a registration request to the AMF device. The registration request may request the AMF device to register and authenticate the UE with a wireless network (e.g., a RAN associated with the AMF device). The registration request may include information relating to a user identity associated with the UE, a data network name associated with the UE, a SUPI of the UE, a group identifier associated with the UE, and/or the like.

As further shown in FIG. 6, and by reference number 620, the AMF device may select the PCF device and transmit a policy request to the PCF device to create an access and mobility policy for the UE based on the registration request. The policy request may include information relating to a SUPI of the UE, a service area restriction of the UE, a list of allowed TAIs for the UE, a list of disallowed TAIs for the UE, an RFSP index of the UE, a network access type of the UE, a location of the UE, a time zone of the UE, a serving network of the UE, a RAT type of the UE, and/or the like.

As further shown in FIG. 6, and by reference number 630, the PCF device selected by the AMF device may determine an appropriate access and mobility policy for the UE, and return the access and mobility policy to the AMF device. The access and mobility policy may include information relating to a service area restriction of the UE, a list of allowed TAIs for the UE, a list of disallowed TAIs for the UE, an RFSP index that applies to the UE, and/or the like.

As further shown in FIG. 6, and by reference number 640, the PCF device may transmit a binding request to the BSF device during registration of the UE and/or after registration of the UE is complete. The binding request may include information relating to a user identity associated with the UE, a data network name associated with the UE, a SUPI of the UE, a network address of the UE, a group identifier associated with UE, a network address of the PCF device, a type of session policy generated by the PCF device, and/or the like.

As further shown in FIG. 6, and by reference number 650, the BSF device may generate binding data for the PCF device and the UE and a binding identifier for indexing the binding data. The binding data may include information identifying the PCF device, the UE, the type of session policy generated by the PCF device, a user identity associated with the UE, a network address of the UE, a data network name associated with the UE, a SUPI of the UE, a network address of the PCF device, a group identifier associated with the UE, and/or the like. The BSF device may store the binding data and the binding identifier and/or cause the binding data and the binding identifier to be stored in a data structure accessible to the BSF device.

As further shown in FIG. 6, and by reference number 660, the BSF device may generate a binding response, and transmit the binding response to the PCF device that submitted the binding request. For example, upon generating and/or storing the binding data and the binding identifier, the BSF device may generate a message confirming fulfillment of the binding request and including information relating to the binding data and/or the binding identifier. The BSF device may transmit the message with the binding response.

Figure 7:
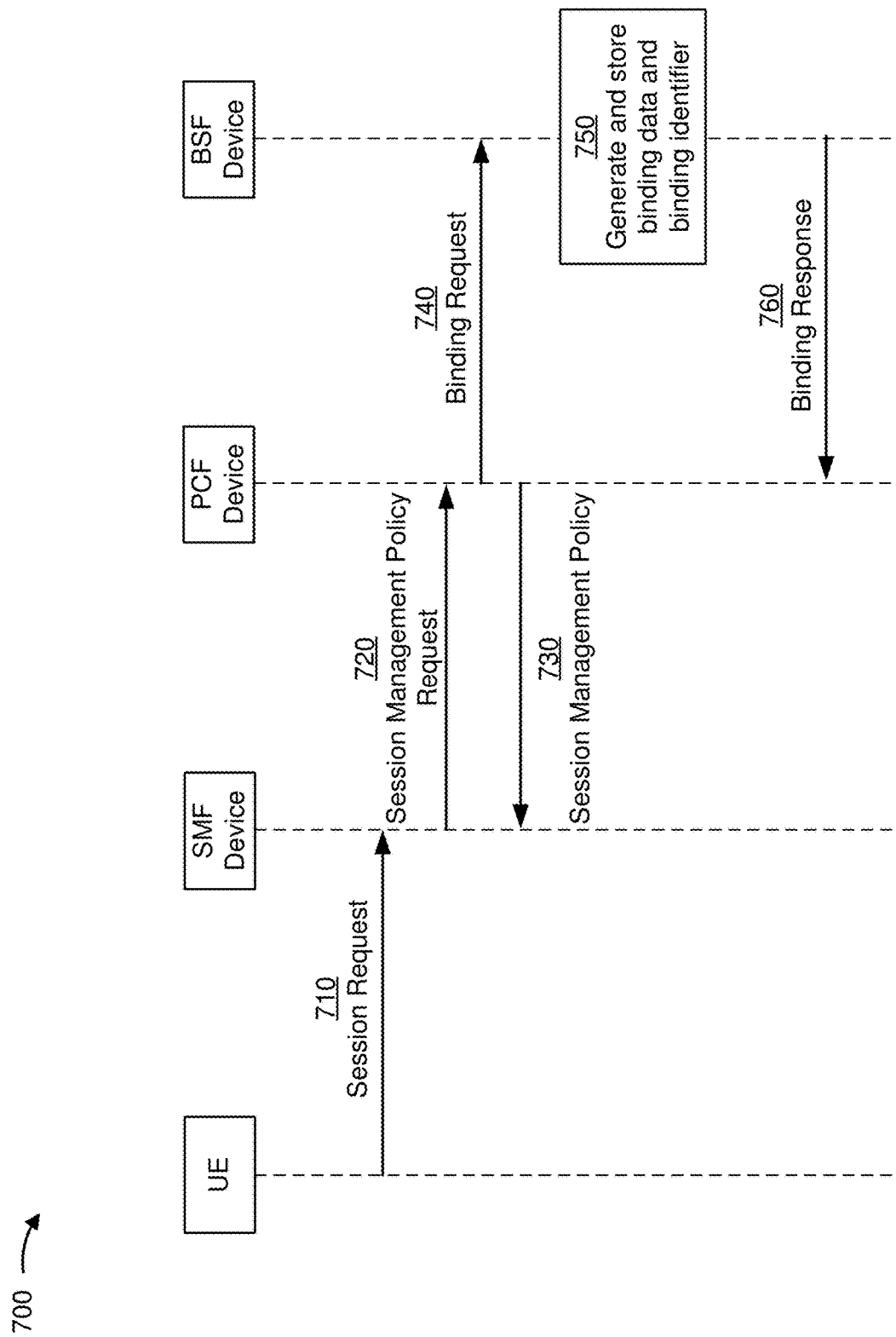
FIG. 7 is a call flow diagram of an example call flow for managing and allocating a binding service in a wireless network.

FIG. 7 is a call flow diagram of an example call flow 700 for managing and allocating a binding service in a wireless network. For example, call flow 700 shows communications between a UE, an SMF device, a PCF device (e.g., a PCF device used to create a session management policy for the UE), and a BSF device that enable an association between the PCF device and the UE to be registered with the BSF device.

As shown in FIG. 7, and by reference number 710, the UE may transmit a session request to the SMF device. The session request may request the SMF device to establish a PDU session for the UE. The session request may include information relating to a user identity associated with the UE, a data network name associated with the UE, a SUPI of the UE, a preferred network of the UE, a request type, a session management capability of the UE, a group identifier associated with the UE, and/or the like.

As further shown in FIG. 7, and by reference number 720, the SMF device may select the PCF device and transmit a policy request to the PCF device to create a session management policy for the UE based on the session request. The policy request may include information relating to a SUPI of the UE, a PDU session identifier, a PDU session type, a data network name associated with the UE, a group identifier associated with the UE, a network access type of the UE, a network address of the UE, a location of the UE, a time zone of the UE, a serving network of the UE, a RAT type of the UE, charging information of the UE, and/or the like.

As further shown in FIG. 7, and by reference number 730, the PCF device selected by the SMF device may determine an appropriate session management policy for the UE, and return the session management policy to the SMF device to establish the PDU session for the UE. The session management policy may include information relating to a PDU session identifier, a requirement of the PDU session for the UE, a network address of the UE, and/or the like.

As further shown in FIG. 7, and by reference number 740, the PCF device may transmit a binding request to the BSF device while establishing the PDU session and/or after establishing the PDU session. The binding request may include information relating to a user identity associated with the UE, a data network name associated with the UE, a SUPI of the UE, a network address of the UE, a group identifier associated with UE, a network address of the PCF device, a type of a session policy generated by the PCF device, and/or the like.

As further shown in FIG. 7, and by reference number 750, the BSF device may generate binding data for the PCF device and the UE and a binding identifier for indexing the binding data. The binding data may include information identifying the PCF device, the UE, the type of a session policy generated by the PCF device, a user identity associated with the UE, a network address of the UE, a data network name associated with the UE, a SUPI of the UE, a network address of the PCF device, a group identifier associated with the UE, and/or the like. The BSF device may store the binding data and the binding identifier and/or cause the binding data and the binding identifier to be stored in a data structure accessible to the BSF device.

As further shown in FIG. 7, and by reference number 760, the BSF device may generate a binding response, and transmit the binding response to the PCF device that submitted the binding request. For example, upon generating and/or storing the binding data and the binding identifier, the BSF device may generate a message confirming fulfillment of the binding request and including information relating to the binding data and/or the binding identifier. The BSF device may transmit the message with the binding response.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a first network device and from a second network device, a binding request that includes information relating to one or more of the second network device, a type of a session policy generated by the second network device, or a user equipment associated with the session policy,
        wherein the session policy includes at least one of an access and mobility policy or a session management policy;
    determining, by the first network device and based on the binding request, an association between the second network device and the user equipment,
        wherein the association is based on determining that the second network device is a policy control function (PCF) device that generated the access and mobility policy for the user equipment;
    generating, by the first network device and based on the association between the second network device and the user equipment, binding data that includes information relating to one or more of the user equipment, the second network device, the type of the session policy, or the association between the second network device and the user equipment;
    assigning, by the first network device, a binding identifier to the binding data,
        the binding identifier being specific to the type of the session policy, and
        the binding identifier being associated with a set of binding data, including the binding data, corresponding to a group of user equipment that includes the user equipment; and
    causing, by the first network device, an action to be performed in connection with one or more of the binding data or the binding identifier,
        wherein the first network device is a binding support function (BSF) device, and
        wherein the action to be performed comprises:
            receiving a query that includes a group identifier corresponding to the group of user equipment; and
            transmitting information identifying a set of network devices, including the second network device and associated with the group of user equipment, identified based on the query.

2. The method of claim 1, wherein the first network device includes a binding support function (BSF) device and the second network device includes a policy control function (PCF) device.

3. The method of claim 1, wherein the group identifier is a first group identifier, and
    wherein receiving the binding request comprises:
        receiving information relating to one or more of a user identity associated with the user equipment, a network address of the user equipment, a data network name associated with the user equipment, a subscription permanent identifier (SUFI) of the user equipment, or a second group identifier of a set of user equipment that includes the user equipment.

4. The method of claim 1, wherein the query is a first query, and
    wherein causing the action to be performed comprises:
        receiving, from a third network device, a second query relating to the user equipment,
            wherein the third network device includes one of an application function (AF) device or a network exposure function (NEF) device;
        identifying respective binding data associated with the user equipment; and
        transmitting, to the third network device, the binding identifier associated with the binding data.

5. The method of claim 1, wherein the query is a first query,
- wherein the group identifier is a first group identifier, and
- wherein causing the action to be performed comprises:
  - receiving, from a third network device, a second query relating to a second group identifier,
    - wherein the third network device includes one of an application function (AF) device or a network exposure function (NEF) device, and
    - wherein the second group identifier identifies one or more machine-to-machine user equipment;
  - identifying respective binding data associated with the one or more machine-to-machine user equipment;
  - identifying, based on the respective binding data associated with the one or more machine-to-machine user equipment, one or more policy control function (PCF) devices associated with the one or more machine-to-machine user equipment; and
  - transmitting, to the third network device, a list identifying the one or more PCF devices.

6. A first network device, comprising:
one or more processors configured to:
- receive, from a second network device, a binding request that includes information relating to one or more of the second network device, a type of a session policy generated by the second network device, or a user equipment associated with the session policy,
  - wherein the session policy includes at least one of an access and mobility policy or a session management policy;
- determine, based on the binding request, an association between the second network device and the user equipment,
  - wherein the association is based on determining that the second network device is a policy control function (PCF) device that generated the access and mobility policy for the user equipment;
- generate, based on the association between the second network device and the user equipment, binding data that includes information relating to one or more of the user equipment, the second network device, the type of the session policy, or the association between the second network device and the user equipment;
- assign a binding identifier to the binding data,
  - the binding identifier being specific to the type of the session policy, and
  - the binding identifier being associated with a set of binding data, including the binding data, corresponding to a group of user equipment that includes the user equipment; and
- cause an action to be performed by a binding support function (BSF) device in connection with one or more of the binding data or the binding identifier,
  - wherein the action to be performed comprises:
    - receiving a query that includes a group identifier corresponding to the group of user equipment; and
    - transmitting information identifying a set of network devices, including the second network device and associated with the group of user equipment, identified based on the query.

7. The first network device of claim 6, wherein the one or more processors, when receiving the binding request, are to:
receive information relating to a network address of the second network device that distinguishes the second network device from a set of network devices associated with the user equipment.

8. The first network device of claim 6, wherein the group identifier is a first group identifier, and
- wherein the one or more processors, when receiving the binding request, are to:
  - receive information relating to one or more of a user identity associated with the user equipment, a network address of the user equipment, a data network name associated with the user equipment, a subscription permanent identifier (SUPI) of the user equipment, or a second group identifier of a set of user equipment that includes the user equipment.

9. The first network device of claim 6, wherein the group identifier is a first group identifier, and
- wherein the one or more processors, when generating the binding data, are to:
  - generate information relating to one or more of a user identity associated with the user equipment, a network address of the user equipment, a data network name associated with the user equipment, a subscription permanent identifier (SUPI) of the user equipment, a second group identifier of a set of user equipment that includes the user equipment, or a network address of the second network device.

10. The first network device of claim 6, wherein the group identifier is a first group identifier, and
- wherein the one or more processors, when causing the action to be performed, are to:
  - store, in a data structure, respective binding data associated with one or more user equipment;
  - update the data structure with the respective binding data associated with the one or more user equipment; and
  - enable the respective binding data associated with the one or more user equipment to be identified, within the data structure, using one or more of the binding identifier, a user identity associated with the one or more user equipment, a network address of the one or more user equipment, a data network name associated with the one or more user equipment, a subscription permanent identifier (SUPI) of the one or more user equipment, or a second group identifier of a set of user equipment that includes the one or more user equipment.

11. The first network device of claim 6, wherein the query is a first query, and
- wherein the one or more processors, when causing the action to be performed, are to:
  - receive, from a third network device, a second query relating to the user equipment,
    - wherein the third network device includes one of an application function (AF) device or a network exposure function (NEF) device;
  - identify respective binding data associated with the user equipment;
  - identify, based on the respective binding data associated with the user equipment, the second network device associated with the user equipment; and
  - transmit, to the third network device, information identifying the second network device.

12. A non-transitory computer-readable medium storing instructions, the instructions comprising:
one or more instructions that, when executed by one or more processors, cause the one or more processors to:
- receive, from a policy control function (PCF) device, a binding request that includes information relating to one or more of the PCF device, a type of a session policy generated by the PCF device, or a user equipment associated with the session policy,
  wherein the session policy includes at least one of an access and mobility policy or a session management policy;
determine, based on the binding request, an association between the PCF device and the user equipment,
  wherein the association is based on determining that the PCF device generated the access and mobility policy for the user equipment;
generate, based on the association between the PCF device and the user equipment, binding data that includes information relating to one or more of the user equipment, the PCF device, the type of the session policy, or the association between the PCF device and the user equipment;
assign a binding identifier to the binding data,
  the binding identifier being specific to the type of the session policy, and
  the binding identifier being associated with a set of binding data, including the binding data, corresponding to a group of user equipment that includes the user equipment; and
cause an action to be performed by a binding support function (BSF) device in connection with the binding data,
  wherein the action to be performed comprises:
    receiving a query that includes a group identifier corresponding to the group of user equipment; and
    transmitting information identifying a set of network devices, including the PCF device and associated with the group of user equipment, identified based on the query.

13. The non-transitory computer-readable medium of claim 12, wherein the one or more instructions, that cause the one or more processors to receive the binding request, cause the one or more processors to:
  receive information relating to a network address of the PCF device that distinguishes the PCF device from a set of PCF devices.

14. The non-transitory computer-readable medium of claim 12, wherein the group identifier is a first group identifier, and
  wherein the one or more instructions, that cause the one or more processors to receive the binding request, cause the one or more processors to:
    receive information relating to one or more of a user identity associated with the user equipment, a network address of the user equipment, a data network name associated with the user equipment, a subscription permanent identifier (SUPI) of the user equipment, or a second group identifier of a set of user equipment associated with the user equipment.

15. The non-transitory computer-readable medium of claim 12, wherein the group identifier is a first group identifier, and
  wherein the one or more instructions, that cause the one or more processors to generate the binding data, cause the one or more processors to:
    generate information relating to one or more of a user identity associated with the user equipment, a network address of the user equipment, a data network name associated with the user equipment, a subscription permanent identifier (SUPI) of the user equipment, a second group identifier of a set of user equipment associated with the user equipment, or a network address of the PCF device.

16. The non-transitory computer-readable medium of claim 12, wherein the group identifier is a first group identifier, and
  wherein the one or more instructions, that cause the one or more processors to cause the action to be performed, cause the one or more processors to:
    store, in a data structure, respective binding data associated with one or more user equipment;
    update the data structure with the respective binding data associated with the user equipment; and
    enable the respective binding data associated with the user equipment to be identified, within the data structure, using one or more of the binding identifier associated with the binding data, a user identity associated with the user equipment, a network address of the user equipment, a data network name associated with the user equipment, a subscription permanent identifier (SUPI) of the user equipment, or a second group identifier of a set of user equipment associated with the user equipment.

17. The non-transitory computer-readable medium of claim 12, wherein the query is a first query,
  wherein the group identifier is a first group identifier, and
  wherein the one or more instructions, that cause the one or more processors to cause the action to be performed, cause the one or more processors to:
    receive, from an application function (AF) device, a second query relating to a second group identifier, and
      wherein the second group identifier identifies one or more machine-to-machine user equipment;
    identify respective binding data associated with the one or more machine-to-machine user equipment;
    identify, based on the respective binding data associated with the one or more machine-to-machine user equipment, one or more PCF devices associated with the one or more machine-to-machine user equipment; and
    transmit, to the AF device, a list identifying the one or more PCF devices.

18. The method of claim 1, wherein the binding identifier is assigned to the binding data corresponding to the PCF device.

19. The device of claim 6, wherein the binding identifier is assigned to the binding data corresponding to the PCF device.

20. The device of claim 12, wherein the binding identifier is assigned to the binding data corresponding to the PCF device.

* * * * *